(12) United States Patent
Shilane et al.

(10) Patent No.: US 9,128,823 B1
(45) Date of Patent: Sep. 8, 2015

(54) SYNTHETIC DATA GENERATION FOR BACKUPS OF BLOCK-BASED STORAGE

(75) Inventors: Philip N. Shilane, Yardley, PA (US); Hyong Shim, Basking Ridge, NJ (US); Kadir Ozdemir, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 239 days.

(21) Appl. No.: 13/612,393

(22) Filed: Sep. 12, 2012

(51) Int. Cl.
*G06F 12/00* (2006.01)
*G06F 12/02* (2006.01)
*G06F 12/08* (2006.01)

(52) U.S. Cl.
CPC ........ *G06F 12/0246* (2013.01); *G06F 12/0284* (2013.01); *G06F 12/0862* (2013.01)

(58) Field of Classification Search
CPC ............ G06F 12/0246; G06F 12/0862; G06F 12/0804
See application file for complete search history.

(56) References Cited

U.S. PATENT DOCUMENTS

| | | | |
|---|---|---|---|
| 8,751,725 B1* | 6/2014 | Gangadharan et al. | 711/100 |
| 2003/0182502 A1* | 9/2003 | Kleiman et al. | 711/114 |
| 2011/0055171 A1 | 3/2011 | McNutt | |
| 2012/0198152 A1* | 8/2012 | Terry et al. | 711/114 |
| 2012/0265933 A1* | 10/2012 | Gupta | 711/114 |

* cited by examiner

*Primary Examiner* — Cheng-Yuan Tseng
*Assistant Examiner* — Arvind Talukdar
(74) *Attorney, Agent, or Firm* — Blakely, Sokoloff, Taylor & Zafman LLP

(57) ABSTRACT

A system and method for generating synthetic data to simulate backing up data between a primary storage system and a protection storage system is presented. In one embodiment, a first track in a set of tracks is selected at random. Having selected a first track, at least a first block in the first track is modified. Subsequently, it is determined, based on a track run probability, whether to modify a second track that is consecutive to the first track or a third track that is selected randomly. Depending on the determination, at least one block is modified at either the second or third track. Other embodiments are also described herein.

21 Claims, 6 Drawing Sheets

SYNTHETIC DATA GENERATION FOR BACKUPS OF BLOCK-BASED STORAGE

FIELD OF INVENTION

Embodiments of the present invention relate generally to data storage systems. More particularly, embodiments of the invention relate to generating synthetic data that parallels real-world data manipulation for protection of block-based storage.

BACKGROUND

In modern computer systems, a file system stores and organizes computer files to enable a user to efficiently locate and access requested files. File systems can utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the primary data storage devices or a data storage service company. Data can be added to the storage system at any frequency and at any amount.

Data in a data storage system can be arranged hierarchically in the storage system, which is particularly necessary when the amount of data exceeds the available main memory. Consequently, auxiliary memory can be employed to accommodate large amounts of data in a data storage system. Auxiliary memory is not accessible by a computer's central processing unit (CPU), but can be read into CPU main memory in portions so that the data can be manipulated. Auxiliary memory can extend to storage that must be mounted (either automatically or manually) to be read into a CPU's main memory.

File systems can be built on top of block-based storage and allocate storage for user data and file system metadata in units of file-system blocks. A file-system block corresponds to an integral number of block-storage blocks. For example, a file-system block can be four kilobytes while a block-storage block can be 512 bytes.

Block-based storage is widely used for primary storage. An efficient method of backing up primary storage is to detect and backup only changed blocks. The changed blocks can be applied to an earlier full backup to create a new, complete backup reflecting up-to-date changes. Advantageously, less data is transferred to create the primary backup since only a fraction of the block storage system has likely been modified since the last backup. Synthetic datasets that closely parallel the changed blocks of real-world datasets can be used to test a block-based storage system and therefore improve its design and implementation.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1A:
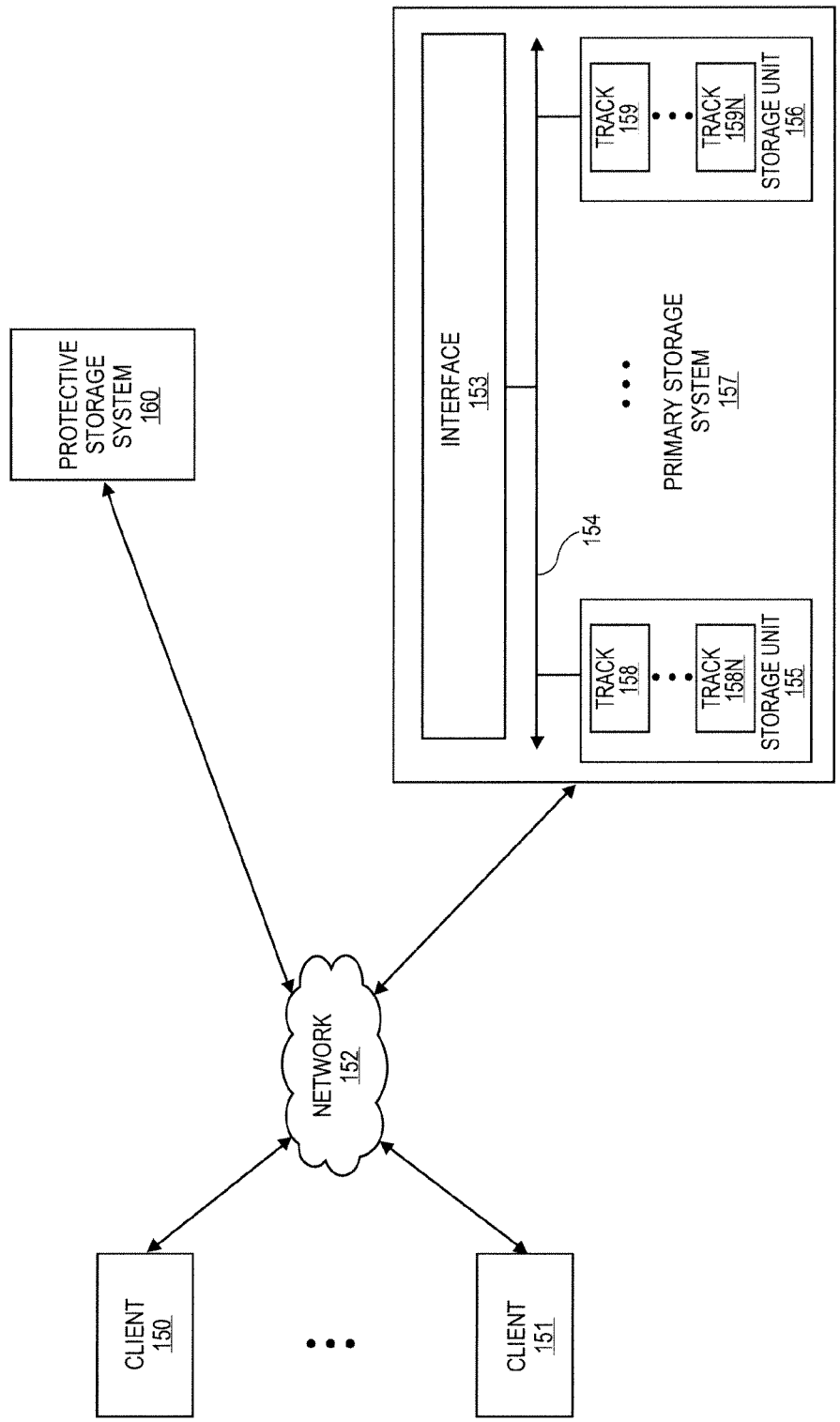
FIG. 1A is a block diagram of a real-world data generation system featuring data protection at a protection storage system.

To begin, FIG. 1A illustrates a real-world block-based storage system simulated by some embodiments of the invention. Here, clients 150-151 send write data to primary storage system 157 across network 152. Data at storage system 157 can be organized in storage units 155 and 156 as tracks 158-158$n$ and 159-159$n$, respectively. Subsequently, data (usually changed data) is sent from primary storage system 157 to protection storage system 160.

In primary storage system 157, a sequence of bits or bytes at a storage unit can be demarcated as a block; data structured in this way is said to be "blocked." Blocks can be of any size (e.g., 512 bytes). Blocks within primary storage system 157 are grouped together to form tracks; each track is composed of at least one block. For example, the Symmetrix® VMAX™ storage system developed by EMC Corporation features 512-byte blocks that are grouped into sixty-four kilobyte (KB) tracks. However, embodiments described herein can accommodate any block size and any track size. Furthermore, both block size and track size may vary across primary storage system 157—e.g., storage unit 155 can feature a different block and/or track size than is featured at storage unit 156.

According to the real-world system of FIG. 1A, a data protection (e.g., backup) process can occur at specified intervals wherein all modified tracks (i groups of blocks having at least one modified block) at a primary storage system (e.g., primary storage system 157) are copied to protection storage system 160. This data protection process may occur at varying incremental intervals (e.g., seconds, minutes, hours, days, etc.) and thus particular intervals may reflect varying block modification patterns. For example, a twenty-four hour interval may have a different fraction of modified tracks and those modified tracks may be more likely to be consecutive tracks (e.g., tracks located next to one another at a storage system) than the track modification pattern of a twelve-hour interval. Embodiments comprehending varying block modification patterns according to different time intervals are described in this Specification (particularly with respect to embodiments shown at FIGS. 3A-B).

Figure 1B:
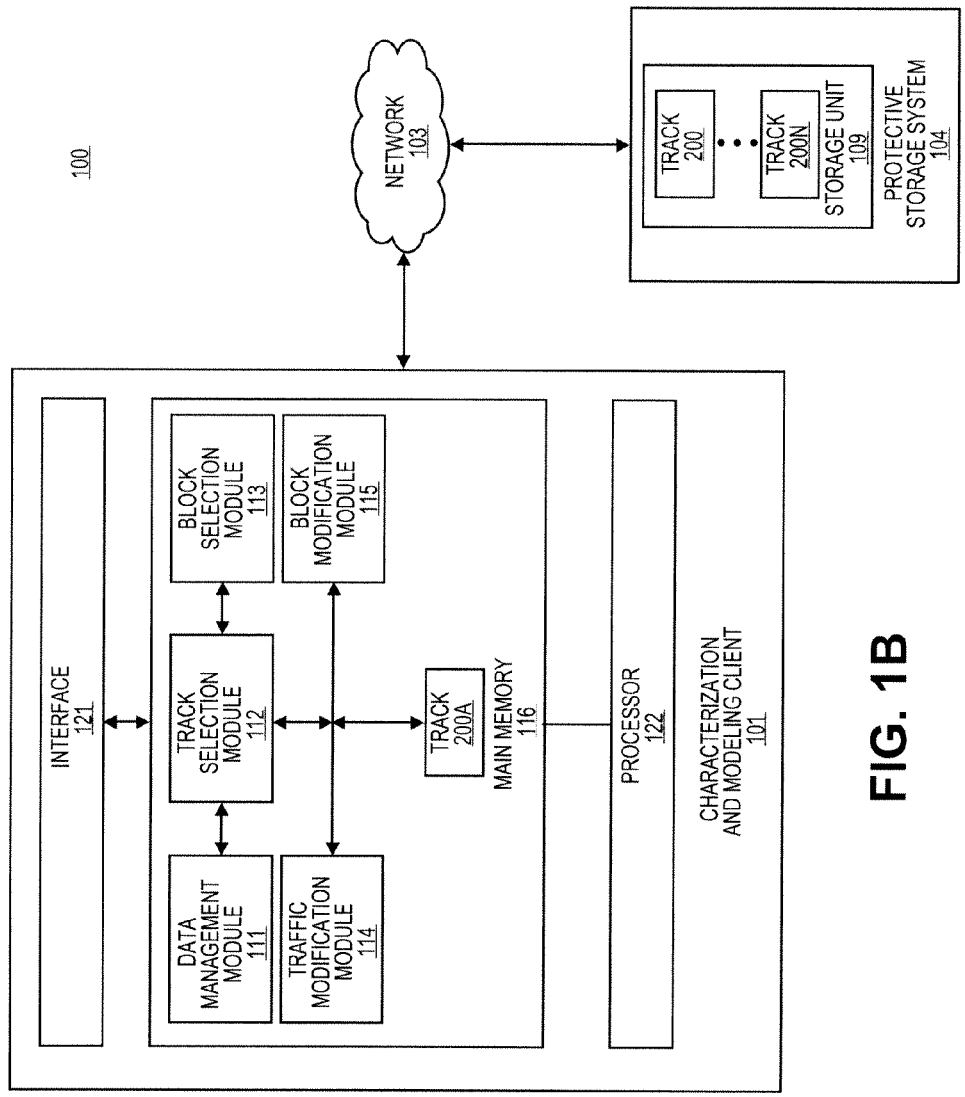
FIG. 1B is a block diagram of one embodiment of a synthetic data generation system simulating real-world data generation and protection.

Turning to FIG. 1B, a block diagram is shown illustrating a synthetic data generation system 100 according to one embodiment of the invention. System 100 of FIG. 1B includes, but is not limited to, synthetic data generation client 101 communicatively coupled to a protection storage system 104 over network 103. In relation to FIG. 1A, the interaction of clients 150-151 with primary storage system 157 and protection storage system 160 is simulated by the interaction of synthetic data generation client 101 with protection storage system 104. However, in the system of FIG. 1A clients 150-151 are unaware of the grouping of blocks into tracks. Clients 150-151 can have blocks in memory while processing them, but any changes to the blocks are sent to primary storage system 157 to be preserved. Effectively, FIG. 1B illustrates modifying data at protection storage system 104, and in this illustration synthetic data generation client 101 simulates how the blocks on primary storage system 157 of FIG. 1A are modified by applications and user input at clients 150-151 and subsequently backed up at protection storage system 160. But where FIG. 1B depicts modules 111-115 that are aware of the block- and track-level organization of storage unit 109 at protection storage system 104, the real-world architecture shown at FIG. 1A does not feature clients that are aware of the block- and track-level organization of primary storage system 157. Embodiments of the invention describing the pattern of data modification by synthetic data generation client 101 on protection storage system 104 can be analogous to the modification by clients 150-151 of data stored at primary storage system 157 and the transfer of changed data (e.g., tracks) to protection storage system 160. Similarly, selecting tracks at storage unit 109 from protection storage system 104 to modify at client 101 is analogous to the real-world process of sending data modified by clients 150-151 at storage units 155-156 from primary storage system 157 to protection storage system 160. The embodiments of the invention modify data by synthetic data generation client 101 to parallel the pattern of data modification by real-world clients 150-151. As described above, the data protection process may occur at varying incremental intervals (e.g., seconds, minutes, hours, days, etc.) and thus synthetic data generation client 101 can simulate varying block modification patterns at different time intervals.

With respect to the architecture an embodiment of the invention shown at FIG. 1B, client 101 can be any type of client such as a server, a personal computer (e.g., desktops, laptops, and tablets), a "thin" client, a personal digital assistant (PDA), a Web-enabled appliance, a gaming device, a media player, a mobile phone (e.g., Smartphone), or similar computing device. Network 103 can be any type of network such as a local area network (LAN), a wide area network (WAN) such as the Internet, a corporate intranet, a metropolitan area network (MAN), a storage area network (SAN), a bus, or any combination thereof. The network 103 can include any number of wired and/or wireless links and any number of intermediate networking elements or computing devices. In an alternative embodiment, network 103 does not couple client 101 and protection storage system 104; rather, protection storage system 104 is locally located within client 101.

Protection storage system 104 can include any type of server or cluster of servers that can communicate with a remote system (e.g., I/O operations between protection storage system 104 and synthetic data generation client 101). Protection storage system 104 is adapted to facilitate data protection through data protection actions such as backups, archives, disaster recovery storage, long-term retention, snapshot retention, and other similar data protection actions. Accordingly, protection storage system 104 can be, for example, a storage server used for any of various different purposes, such as to provide multiple users with access to shared data, to back up mission-critical data, to archive data, to provide disaster recovery storage, to provide long-term retention, and/or to act as a snapshot repository. In certain embodiments, protection storage system 104 can be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Protection storage system 104 can be implemented as part of an archive and/or backup system such as a de-duplication storage system available from EMC® Corporation of Hopkinton, Mass. Protection storage system 104 can have a distributed architecture, or all of its components can be integrated into a single unit.

In one embodiment, protection storage system 104 includes storage unit 109 which can operate as an active storage to receive and store external or fresh user data; a second storage unit (not shown) can operate as a target storage unit to periodically archive data from the active storage unit according to an archiving policy or scheme. Storage unit 109 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage unit 109 and additional storage units (not shown) can also be combinations of such devices. In the case of disk storage media, storage units 109 can be organized into one or more volumes of Redundant Array of Inexpensive Disks (RAID).

In protection storage system 104, data at storage unit 109 can be identified in units called blocks. Blocks can be of any size (e.g., 512 bytes). Blocks at protection storage system 104 can be identified in groups of blocks called tracks (e.g., tracks 200-200$n$ of FIG. 1B); each track is composed of at least one block. A dataset at storage unit 109 can be organized in a manner similar to that described above for primary storage system 157: 512-byte blocks can be grouped into sixty-four kilobyte (KB) tracks.

In one embodiment, synthetic data generation client 101 includes, but is not limited to, several components: interface 121; processor 122; and main memory 116 with data management module 111, track selection module 112, block selection module 113, track modification module 114 and block modification module 115. Modules 111-115 located at main memory 116 of client 101 are adapted to program processor 122 to generate and manipulate a dataset such as a dataset separated into tracks 200-200$n$ at storage unit 109 of protection storage system 104.

Client 101 includes therein data management module 111 adapted to determine a quantity of tracks at storage unit 109 at protection storage system 104 to modify. In one embodiment, data management module 111 is also adapted to generate synthetic data at storage units 109 of protection storage unit 104.

In real world scenarios, primary input/output (I/O) from user applications modifies blocks. However, to accurately simulate how blocks on a protection storage system are modified by applications, synthetic data reflecting real world usage is necessary. In one embodiment, synthetic data is any anonymized data—i.e., data that is absent of any confidential or identifying information. Synthetic data can be as simple as random data, but can include any data that does not identify confidential information. In one embodiment, this data is randomly generated by, for example, data management module 111 to be stored at storage unit 109 of protection storage system 104. Alternatively, the first generation data is generated by anonymizing a real-world dataset. In even another embodiment, the first generation dataset is received at client 101 as input. For example, the input can be received as user input through interface 121 where it is then stored at storage unit 109 of protection storage system 104. In this way, datasets having tracks 200-200n at storage units 109 can be generated either as random data or by anonymizing a real-world dataset.

Track selection module 112 is communicatively coupled to data management module 111 and is adapted to select tracks to modify (e.g., tracks 200-200n at storage unit 109, respectively, of protection storage system 104) where the quantity of tracks to modify has not been reached. Track selection module 112 is adapted to select tracks stored at protection storage system 104 to modify either at random or, where a previous track has been selected, to select a next consecutive track in the dataset. Track selection module 112 can make the decision to modify a next consecutive track or a random track based on a track run probability. The track run probability can, for example, be stored in a data structure at track selection module 112 or at a database management system (not shown) accessible by client 101. In some embodiments, a random binary function is used to select the next track wherein a 1 represents updating the next consecutive track and 0 represents terminating the track modification run such that a 1 is returned with the track run probability. In such an embodiment, a 0 would dictate that track selection module 112 selects the next track at random. A track can be modified by writing modified data from client 101 to protection storage system 104. In another embodiment, a track to be modified (e.g., track 200a) can be read into main memory 116 from protection storage system 104. Track 200a is a track from the set of tracks 200-200n stored at protection storage system 104. Alternatively, more than one track can be simultaneously read into main memory 116 from protection storage system 104.

Communicatively coupled to track selection module 112 is block selection module 113. Block selection module 113 is adapted to select a specific technique for modifying blocks of a track selected by track selection module 112—e.g., modify all blocks or modify blocks only in multiples of four or eight kilobytes. In the context of real-world systems, updates to block are frequently either to all blocks in a track or to multiples of four or eight kilobytes.

Communicatively coupled to both block selection module 113 and track selection module 112 is track modification module 114. Track modification module 114 is adapted to select blocks to be modified within the track at protection storage system 104 selected by track selection module 112. Track modification module 114 can select all the blocks at a track, select blocks (or groups of blocks) at random or, where a previous block (or group of blocks) has been selected, select a next consecutive block in the track. Track modification module 114 can make the decision to modify a next consecutive block based on a block run probability. The block run probability can be stored, for example, in a data structure at track modification module 114 or at a database management system (not shown) accessible by client 101. In some embodiments, a random binary function is used to select the next block wherein a 1 represents updating the next consecutive block and 0 represents terminating the block modification run such that a 1 is returned with the block run probability. In such an embodiment, a 0 would dictate that track modification module 114 terminate the block modification run.

Finally, block modification module 115 is communicatively coupled with track modification module 114 and is adapted to modify a block selected by track modification module 114. In some embodiments, block modification module 115 modifies data at a block by writing random data to that block.

As described above, data modification and the associated processes to determine data to modify is carried out by client 101. However, in one embodiment client 101 does not buffer data or store data locally at client 101; rather, data modified by client 101 is sent to protection storage system 104 to be stored at storage unit 109. Thus, in one embodiment only changed tracks are written from client 101 to storage system 104. These changed tracks can be applied to an earlier full protection dataset to create a new, complete protection dataset reflecting up-to-date changes. Either one or both of client 101 and protection storage system 104 can track changes made to blocks at tracks 200-200n. Tracking can be accomplished through a number of methods, such as maintaining a "dirty bit" indicating a block has been modified since the last protection action. Also, client 101 can create all of tracks 200-200n to be stored at storage system 109, such as in the case of an initial creation of a dataset.

Figure 2:
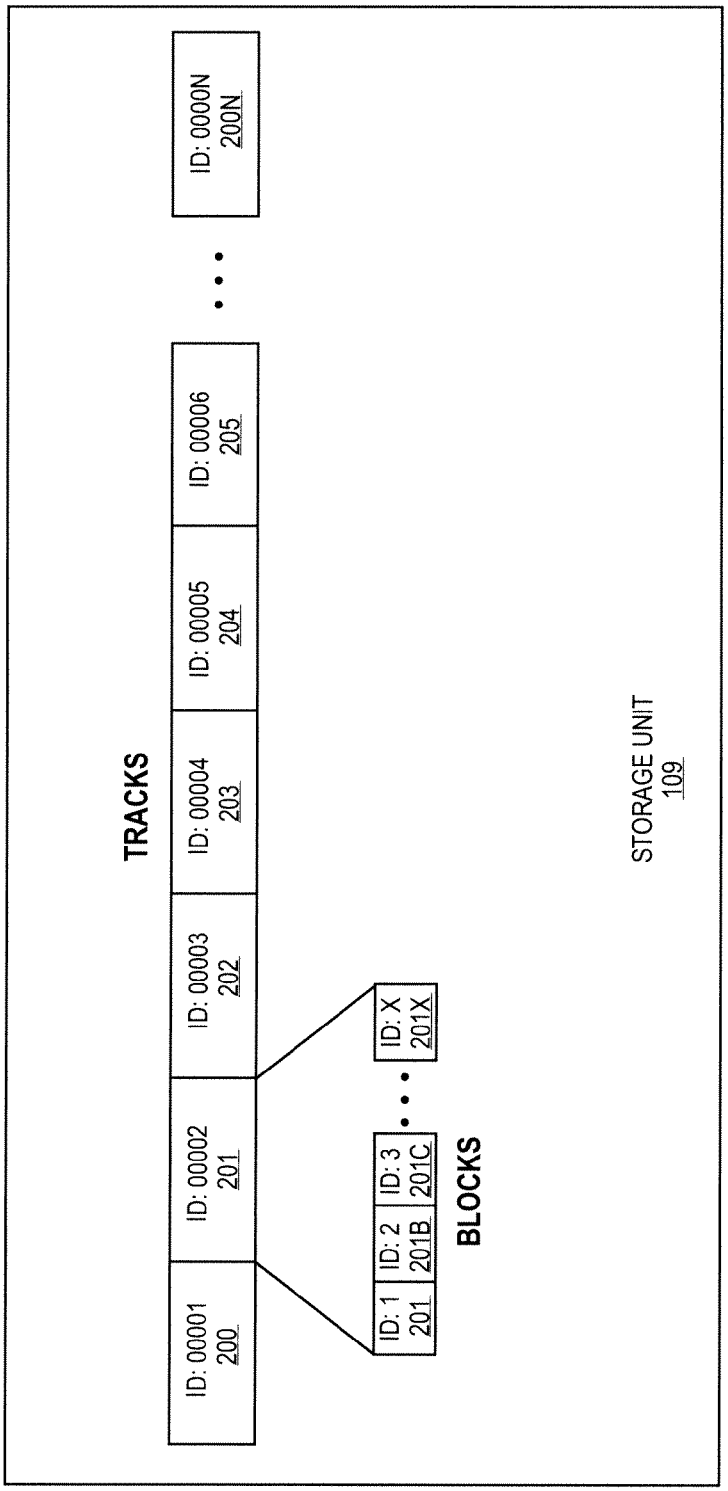
FIG. 2 is a block diagram of one embodiment of tracks and blocks at a data storage system.

Turning briefly to FIG. 2, an exemplary embodiment of blocked data grouped into tracks is shown. Tracks 200-200n can be, for example, a set of tracks 200-200n of storage unit 109 residing at protection storage system 104 of FIG. 1B. Additionally, any one of the tracks 200-200n can be track 200a that is selected and read into main memory 116 of client 101. In FIG. 2, track 201 is magnified to illustrate blocks 201a-201x composing track 201. Similar to track 201, tracks 200 and 202-200n are composed of groups of blocks. Importantly, FIG. 2 is descriptive and not comprehensive. In some embodiments, storage unit 109 includes myriad tracks and each track is composed of myriad blocks; thus there can be n tracks and each track can be composed of x blocks. In some embodiments, the number of blocks grouped together to define a track is not uniform—e.g., a first track may be composed of 128 blocks while a last track may be composed of 127 blocks.

Still with reference to FIG. 2, each track 200-200n can be identified in protection storage system 104 by a unique track identification (ID) number. For example, track 200 may have track ID number 1. Accordingly, protection storage system 104 of FIG. 1B can monitor (or track) tracks; for example, tracks with modified blocks can be tracked. In some embodiments, sequential track ID numbers identify blocks that are consecutive in protection storage system 104 by, for example, being physically located next to one another at storage unit 109 and having sequential address locations. In one embodiment, this information (e.g., track ID numbers) is accessible by synthetic data generation client 101 across network 103.

In an embodiment of the tracks within protection storage system 104, a track has a "header" block that identifies the blocks within the track and contains other identification and maintenance information such as the exact size of the track, the address of the track in protection storage system 104, an identification of a next consecutive track and/or previous track in protection storage system 104, a dirty bit to indicate the track has been changed since the last data protection action, and other information pertinent to maintaining the track. In one embodiment, this information is accessible by synthetic data generation client 101 across network 103.

Still with reference to FIG. 2, each block 201a-201x may be identified in protection storage system 104 by a unique block identification (ID) number. For example, block 201a can have block ID number 1. Because the number of blocks at a track is a discrete number, the block ID number can simply be an integer incremented from a previous block ID number; for example, block 201x may be the five hundred-twelfth block and therefore have block ID number 512. Accordingly, protection storage system 104 of FIG. 1B can track blocks; for example, modified blocks can be tracked (e.g., by maintaining a dirty bit at the block or track indicating that the block has been modified). In some embodiments, sequential block ID numbers identify blocks that are consecutive in a track by, for example, being physically located next to one another at a track and having sequential address locations at a track (e.g., blocks 201a and 201b). In one embodiment, this information (e.g., block ID numbers) is accessible by synthetic data generation client 101 across network 103.

In an embodiment of the blocks composing the tracks, a block has a "header" portion, which may be a number of bytes within the block. The header portion may contain identification and maintenance information pertinent to maintaining the block at protection storage system 104. For example, a block's header can identify information such as the exact size of the block, the address of the block, a dirty bit to indicate the block has been changed since the last data protection action, a track to which the block is assigned, and other information pertinent to maintaining the block. In one embodiment, this information is accessible by synthetic data generation client 101 across network 103.

In some embodiments, identification and maintenance information, such as the information presented above with respect to blocks and tracks, can be maintained in protection storage system 104. Thus, protection storage system 104 can track identification and maintenance information separate from, or in addition to, maintaining such information at the tracks and/or blocks. For example, protection storage system 104 can have a database management system (not shown) to store this information. In such embodiments, track information, such as track ID and track location in protection storage system 104, is maintained at a track table with fields such as track_id, track_addr, etc. Similarly, block information, such as block ID, block location in protection storage system 104 and associated track ID, can be maintained at a block table with fields such as block_id, block_addr, track_id, etc. Alternatively, identification and maintenance information can be stored in data structures (not shown) at protection storage system 104. Thus, protection storage system 104 can track identification and maintenance information separate from, or in addition to, maintaining such information at the tracks and/or blocks. In one embodiment, this information is accessible by synthetic data generation client 101 across network 103.

In some embodiments, a track's positional relationship relative to other tracks can be evaluated and stored at synthetic data generation client 101 and/or protection storage unit 104. For example, a middle track may have a positional relationship to two other tracks: a next consecutive track and a previous track. In one embodiment, these two tracks are physically located after and before the middle track in a dataset (e.g., tracks 200-200n at storage unit 109), respectively. The protection storage system 104 can track (or monitor) this relationship through sequential track IDs. In the context of FIG. 2, track 205 assigned track ID 5 can be a middle track having previous track 204, assigned track ID 4, and next consecutive track 206, assigned track ID 6. Alternatively, protection storage system 104 can track the positional relationship of tracks based primarily on an assigned track ID number without respect to the physical location of tracks at the protection storage system 104.

Analogous to the positional relationship of tracks at protection storage system 104, a block's positional relationship relative to other blocks can be evaluated and stored at synthetic data generation client 101 and/or protection storage unit 104. For example, a middle block can have a positional relationship to two other blocks: a next consecutive block and a previous block. In one embodiment, these two blocks are physically located after and before the middle block in a storage unit (e.g., storage unit 109), respectively. Protection storage system 104 can track (or monitor) this relationship through sequential block IDs. In the context of FIG. 2, block 201b assigned block ID 2 can be a middle block having previous block 201a, assigned block ID 1, and next consecutive block 201c, assigned block ID 3. Alternatively, protection storage system 104 can track the positional relationship of blocks based primarily on an assigned block ID number without respect to the physical location of blocks at the storage system.

Figure 3A:
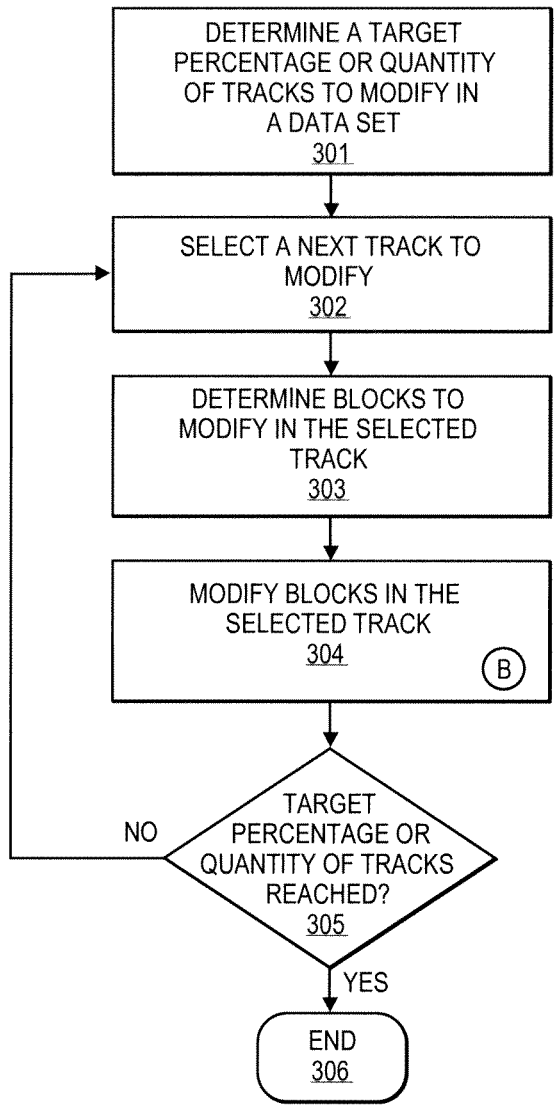
FIG. 3A is a flowchart of one embodiment illustrating a method for generating synthetic data for a dataset at a data storage system.

Turning now to FIG. 3A, a flow diagram is shown illustrating a method for generating synthetic data at the track level for simulated protection actions for block-based storage according to one embodiment of the invention. The method shown can be executed by system 100 of FIG. 1B. Furthermore, the method of FIG. 3A can be performed at tracks 200-200n (with blocks 201a-201x shown at FIG. 2) at storage unit 109, respectively. The method begins at operation 301 wherein a quantity of tracks to modify is determined. In one embodiment of operation 301, synthetic data grouped into tracks is generated before determining the quantity of tracks to modify. For example, tracks 200-200n at storage unit 109 can be generated at operation 301 either as random data or by anonymizing a real-world dataset. The determined quantity can be constrained by a set of tracks available at a dataset (e.g., for tracks 200-200n, the quantity cannot exceed n), or by multiple sets of tracks available at multiple datasets. Alternatively, method of FIG. 3A can be performed across all tracks available at protection storage system 104 and therefore the determined quantity is constrained only by the total number of tracks at protection storage system 104.

Operation 301 of FIG. 3A can be effected through several embodiments. In one embodiment, synthetic data generation client 101 determines a percentage of tracks to modify at data management module 111. Data management module 111 can determine this percentage at random, from one or more predetermined percentage(s) (e.g., administrator-defined values), from a range of percentages, or through another similar algorithm. Subsequently, data management module 111 converts the percentage to a quantity of tracks to modify. Preferably, the converted quantity is an integer and therefore the conversion process performed at data management module 111 can include a rounding algorithm; but the quantity can include fractional values in some embodiments. In another embodiment, data management module 111 simply determines a quantity (without having to convert a percentage) where the quantity is preferably an integer, but can include a fractional value in some embodiments. Similar to a determination process for a percentage, data management module 111 can directly determine the quantity value at random such that the quantity value is less than or equal to the number of available tracks, or the quantity value can be determined from one or more predetermined quantity values, such as by sampling an array of values at random. In an alternative embodiment of operation 301, synthetic data generation client 101 receives a percentage or a quantity value of tracks as input through interface 121; for example, the input can be received through a user input device (not shown), such as a keyboard, mouse, or touch screen interface, coupled to interface 121. Accordingly, data management module 111 determines the received input to be the quantity of tracks to modify. The validity of the quantity—e.g., ensuring the quantity is within a valid range of available tracks—can be confirmed at operation 301 by data management module 111. Additionally, data management module 111 can generate datasets to be stored at protection storage system 104 (e.g., datasets with tracks 200-200n at storage unit 109) either as random data or by anonymizing a real-world dataset before or after determining the quantity of tracks to tracks to modify.

Proceeding to operation 302 of FIG. 3A, a track to modify is selected. In some embodiments, operation 302, and consequently following operations 303-305, is revisited during the method shown at FIG. 3A. Subsequent iterations notwithstanding, a first track is selected at the initial visit to operation 302. In one embodiment, this first track is selected by track selection module 112 of FIG. 1B. Track selection module 112 can select this first track at random. For example, track selection module 112 can randomly select a track ID number from a set of track ID numbers corresponding to the set of available tracks. Alternatively, track selection module 112 selects the lowest available track ID number (e.g., track ID 1) to be the first track. In even another embodiment, track selection module 112 selects the first track from input. For example, the client 101 receives a track ID as input through interface 121; the input can be received from an input device (not shown), such as a keyboard, mouse or touch screen interface, coupled to interface 121. The validity of the selected first track—e.g., ensuring a selected track ID for the first track corresponds to an available track in the set of available tracks—can be confirmed at operation 302 by track selection module 112. In one embodiment, the selected track can be read into memory 116 of client 101 from protection storage system 104. For example, track 200a of FIG. 1B is depicted as a selected track read into memory 116; track 200a is a track from the set of tracks 200-200n at storage unit 109. However, the selected track is not necessarily read into memory, and modification of the selected track can be accomplished by client 101 at protection storage system 104.

Following the initial selection of the first track at operation 302, the method of FIG. 3A progresses to operation 303. As described above, a track is a group of one or more blocks (preferably, more than one); thus, the method of FIG. 3A determines at operation 303 blocks at a track—here, the selected first track—to modify. In one embodiment, this determination is made by block selection module 113 shown as part of synthetic data generation client 101 of FIG. 1B.

In one embodiment, block selection module 113 can select a technique to modify the blocks at a track from one of three techniques: (1) modify all blocks at the track; (2) modify blocks at the track in multiples of four kilobytes (4 KB); and (3) modify blocks at the track in multiples of eight kilobytes (8 KB). In one embodiment, block selection module 113 determines the block modification technique for the selected track through a probability process wherein the chance of a modification technique being selected is based on a block modification technique probability assigned to the technique. Block selection module 113 determines for each of the three techniques a different block modification technique probability. These probabilities reflect real-world block modifications at, for example, clients 150-151 of FIG. 1A, but can be stored at, for example, a data structure in block selection module 113 of FIG. 1B or a database management system (not shown) coupled to synthetic data generation client 101 of FIG. 1B. These probabilities can be supplied through interface 121 (for example, as user input), set as a default value in block selection module 113 or randomly generated by block selection module 113. In an embodiment, each of the three block modification techniques has one associated probability; for example, the probability of modifying all blocks at a track can be 0.67, the probability of modifying blocks in multiples of 4 KB can be 0.12, and the probability of modifying blocks in multiples of 8 KB can be 0.21. Accordingly, block selection module 113 determines the technique to be used for block modification through the probability process. In one embodiment, this technique for block modification is consistent for all block modifications at the selected track. In even another embodiment, the technique selected by an initial visit to operation 303 is maintained for all block modifications at all tracks selected by the method shown at FIGS. 3A-B (i.e., all subsequent iterations have the same block modification technique that is initially selected by a first visit to operation 303).

Alternatively, each block modification technique has multiple probabilities assigned to it wherein each set of probabilities for the three techniques corresponds to a real-world period since a last protection action, such as a backup or archive—e.g., as performed by real-world primary storage system 157 to protection storage system 160 of FIG. 1A. In such an embodiment, the first block modification technique—i.e., modifying all blocks at a track—can have a probability corresponding to a twenty-four hour period since a last protection action, a probability corresponding to a twelve-hour period since a last protection action (e.g., a backup), and a probability corresponding to a six-hour period since a last protection action (e.g., a backup). Similarly, the other two techniques have probabilities corresponding to particular periods. In this embodiment, block selection module 113 first selects a period—i.e., a set of probabilities for the three techniques—for the probability process. Subsequently, block selection module 113 determines the technique to be used for block modification through the probability process. The period selection can be made at random, through input at an interface or other similar methods. The period selected by an initial visit to operation 303 can be maintained for all block modifications at all tracks selected or, alternatively, for the selected track.

At operation 304 of FIG. 3A, modification of data at protection storage system 104 by synthetic data generation client 101 occurs at the block level and consequently manifests as modification at the track level as well. One embodiment of operation 304 is illustrated in detail at the method shown at FIG. 3B. Thus, the method of FIG. 3A continues at operation 304a of FIG. 3B. At operation 304a, modification of the selected track within the synthetic data generation system begins. The operation can be performed by, for example, track modification module 114 in synthetic data generation client 101 shown at FIG. 1B. Following operation 304a, track modification module 114 checks the modification technique selected at block selection module 113. In accordance with the selected block modification technique, the method continues to either operation 304c or operation 304d. Where the selected modification technique is to modify all blocks at a track, data at each block within the selected track is modified at operation 304c. This step can be performed by block modification module 115 of synthetic data generation client 101 on a selected track from storage unit 109. Block modification module 115 can modify a block by writing data (e.g., random data) to a block, deleting data from a block, or adding data to a block. Following operation 304c, the method of FIG. 3B ends (operation 304i) and the method of FIG. 3A continues at decision block 305.

Where track modification module 114 establishes that the selected modification technique is to modify blocks at a track in multiples of 4 KB or 8 KB, track modification module 114 selects a first group of blocks to modify at the initial visit to operation 304d, wherein the first group of blocks is a multiple of 4 KB or 8 KB. Analogous to selecting a first track described above, the starting block for the first group of blocks can be selected at random or, alternatively, through input at the interface 121. In one embodiment, the size of the group of blocks is simply either 4 KB or 8 KB. However, the size of the group of blocks can be a random multiple of 4 KB or 8 KB or a predetermined value (including, for example, a percentage of the size of the selected track) that is a multiple of 4 KB or 8 KB stored at a data structure at track modification module 114. For example, if the technique is to modify a group of blocks that is a multiple of 4 KB, the group of blocks can be eight 512-byte blocks; similarly, if the technique is to modify a group of blocks that is a multiple of 8 KB, the groups of blocks can be sixteen 512-byte blocks. At this point, block modification module 115 of synthetic data generation client 101 modifies each block at storage unit 109 in the first group of blocks by writing data (e.g., random data) to a block.

Figure 3B:
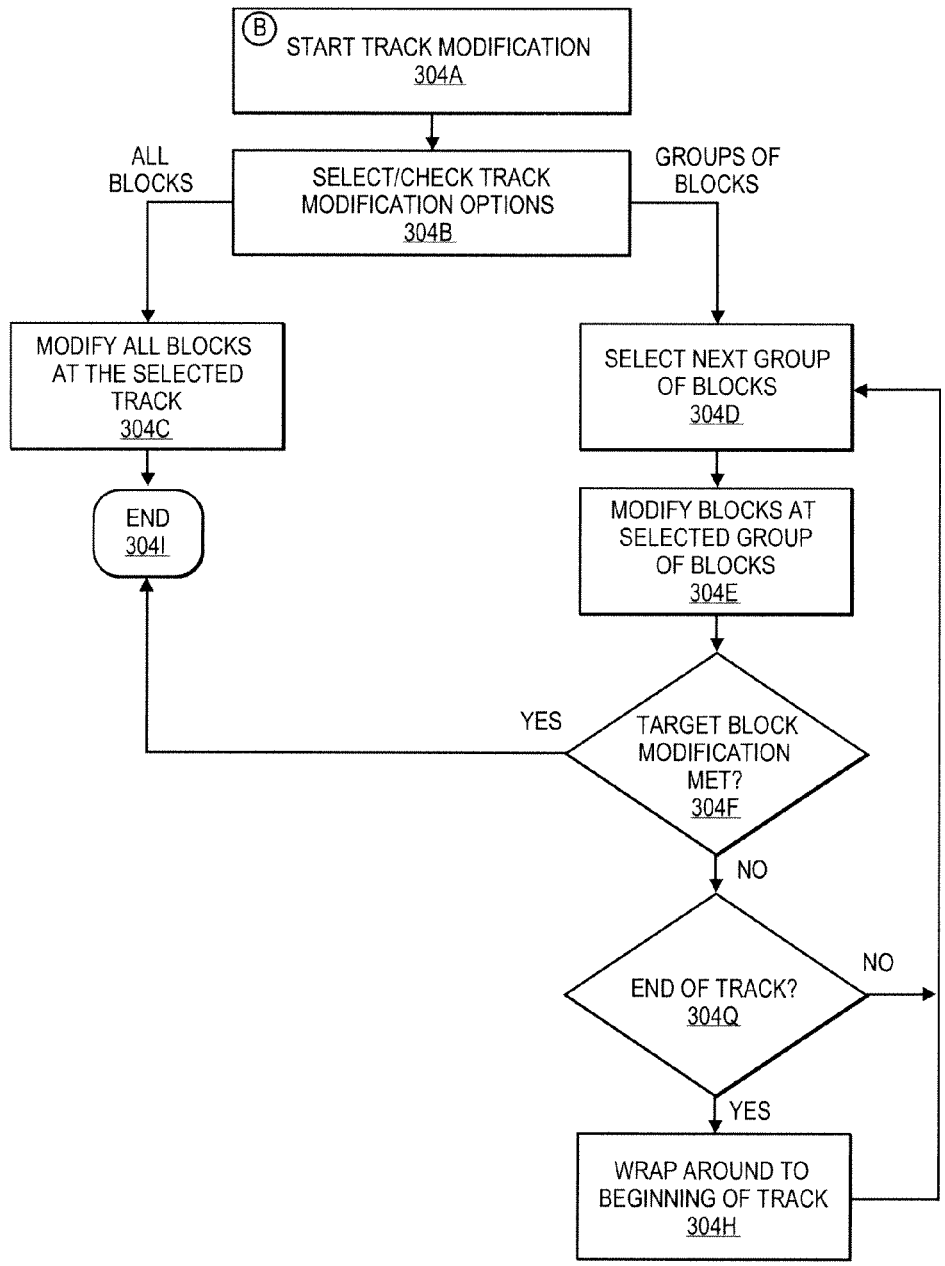
FIG. 3B is a flowchart of one embodiment illustrating a method of track modification for generating synthetic data for a dataset at a data storage system.
Figure 4:
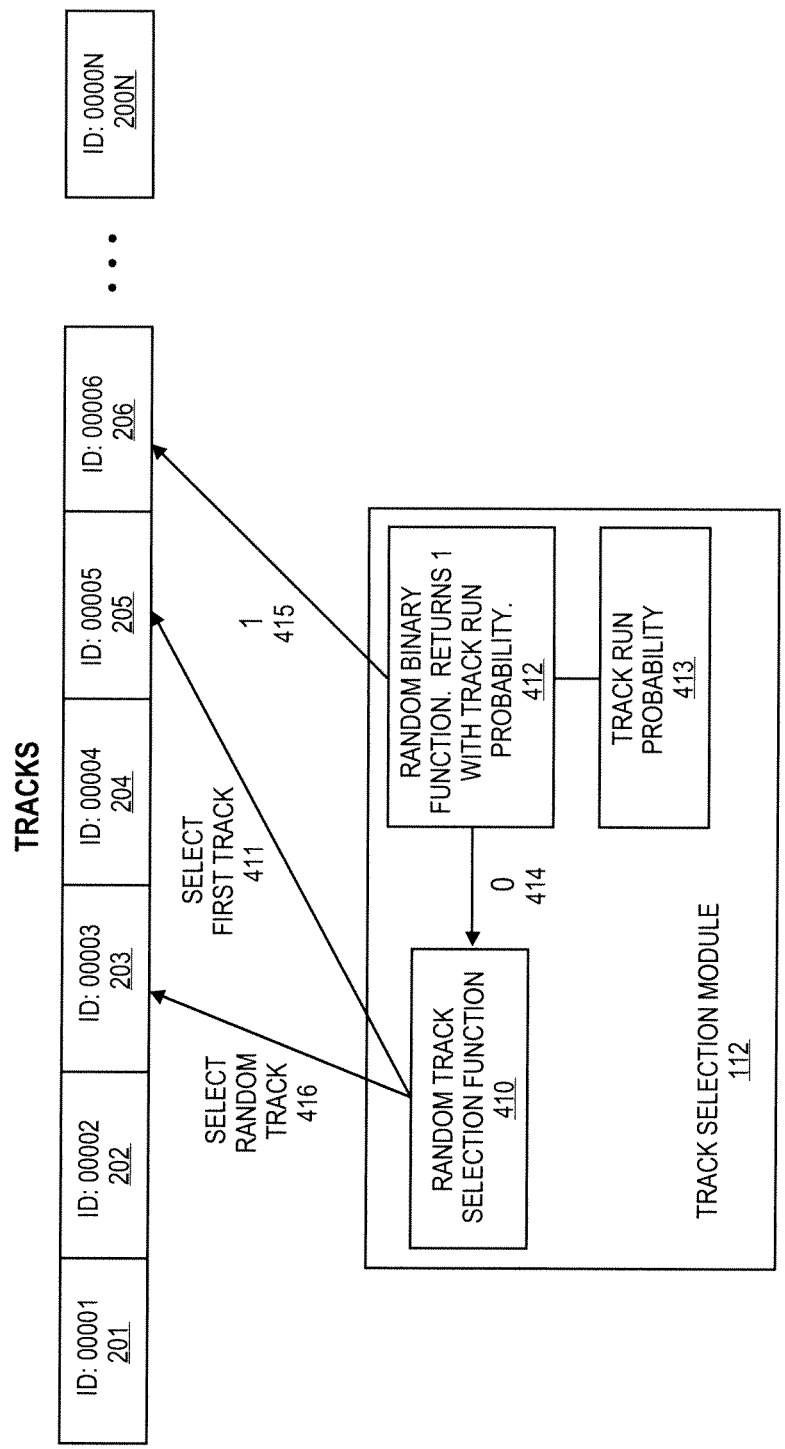
FIG. 4 is a block diagram of one embodiment illustrating the selection of a next track to modify at a data storage system.

Following modification of the first group of blocks at operation 304e, the method of FIG. 3B determines how to proceed with block modification at operation 304f. At operation 304f, it is determined if a next group of blocks within the selected track should be modified. In one embodiment of this operation, track modification module 114 determines, based on a block run probability, if a block modification run should continue by modifying a next consecutive group of blocks within the track. The block run probability can, for example, be stored in a data structure at track modification module 114 or at a database management system (not shown) accessible by client 101. In some embodiments, a random binary function is used to select the next block wherein a 1 represents updating the next consecutive block and 0 represents terminating the block modification run such that a 1 is returned with the block run probability. The random binary function can be stored at track modification module 114. In some embodiments, selecting a next block is analogous to selecting a next track as illustrated below at FIG. 4 (however, the next block is not chosen at random, rather the block run terminates where the binary function returns a "0").

Additionally, there can be different block run probabilities for each block modification technique. For example, the technique to modify a multiple of 4 KB may have a probability of 0.75 of continuing the block modification run, whereas the technique to modify a multiple of 8 KB may have a probability of 0.55. As discussed earlier, the set of block modification run probabilities can vary to reflect a real-world period of time since a last protection action (e.g., a backup). Accordingly, track modification module 114 bases the determination of whether to continue the block modification run on the block run probability corresponding to the current block modification technique. Where the determination is made by track modification module 114 that the method of FIG. 3B should not continue, this method terminates at operation 304i and the method of FIG. 3A resumes at operation 305.

Still referring to FIG. 3B, where operation 304f determines that the block modification run should continue, the method reaches decision block 304g. Because tracks are of finite length, a block modification run can reach the end of a track before concluding. In such a situation, the block modification run wraps around a track by resuming at the beginning of the currently selected track as shown at operation 304h. In one embodiment of operation 304h, a selected group of blocks begins at a position on a track such that the remaining space on the track is insufficient to accommodate the selected group of blocks. This described case can be analogous to wrapping around a block modification run at the end of the track: a portion of the selected group of blocks covers the remainder of the selected track and the remaining portion of the selected group of blocks is located at the start of the selected track.

Following these operations, the method of FIG. 3B returns to operation 304d to select the next consecutive group of blocks. As described above with respect to the first track, the size of the next group of blocks can be a random multiple of 4 KB or 8 KB (depending on the block modification technique) or a predetermined value (including, for example, a percentage of the size of the selected track) that is a multiple of 4 KB or 8 KB stored at a data structure at track modification module 114. In one embodiment, the first selected block modification technique is consistent for all iterations of the method described by FIG. 3B. But in an alternative embodiment, a new block modification technique can be selected at block 304d, for example by using the block modification technique probabilities described above. With the next consecutive group of blocks selected, operation 304e is reached; here, block modification module 115 modifies each block in the next consecutive group of blocks by writing data (e.g., random data) to a block at the selected track.

Subsequently, the method of FIG. 3B revisits operation 304f to determine if a next group of blocks within the track should be modified. Where the determination is made that the method should continue, the method of FIG. 3B continues to iterate as described above. Where the determination is made that the method of FIG. 3B should not continue, this method terminates at operation 304i and the method of FIG. 3A continues at operation 305.

Resuming at decision block 305 of FIG. 3A, the method resolves the next operation by evaluating whether the quantity of tracks to modify (determined at operation 301) has been reached. Where the quantity of tracks to modify has been reached, the method of FIG. 3A terminates at operation 306. However, if the quantity of tracks to modify has not been satisfied, the method begins another iteration at operation 302. Additionally, in some embodiments of this operation the selected track, now modified by client 101, is sent from client 101 to protection storage system 104 to be integrated with the dataset at storage unit 109 (e.g., where track 200a is selected and modified at client 101 and subsequently sent to storage unit 109, track 200a will replace the original track 200a from storage unit 109).

Revisiting operation 302 of FIG. 3A, the method selects a next track to modify. In one embodiment, the next track to modify is selected in one of two ways: (1) the next track is randomly selected; or (2) the next track is the next consecutive track in a dataset (e.g., tracks 200-200n at storage unit 109) of protection storage system 104. The selection of the next consecutive track to modify can be based on a track run probability. Consequently, selecting the next consecutive track with the track run probability implies that a random track is selected with probability 1-(track run probability). The track run probability can be stored at, for example, a data structure at client 101 or a database management system (not shown). Additionally, the track run probability can be a static number. In some embodiments, a random binary function is used to select the next track wherein a 1 represents updating the next consecutive track and 0 represents updating a random track such that a 1 is returned with the track run probability. Instructions that cause a processor (e.g., processor 122) to perform the random binary function can be stored at track selection module 112. The track run probability can be stored at, for example, a data structure at track selection module 112 or a database management system.

An embodiment of subsequent visits to operation 302 (i.e., iterations through operation 302 following initial track selection at the first visit to operation 302, described above) is depicted at FIG. 4. This figure illustrates the role of track selection module 112 in selecting a next track. As a preface, a first track 205 has been selected through, for example, a random track selection function 410 at operation 411. Therefore, having selected the first track 205, a next track is selected. To make this selection, track selection module 112 can employ a random binary function 412 that returns a "1" with the track run probability 413; consequently, the random binary function 412 returns a "0" with probability 1-(track run probability 413). Where the random binary function 412 returns a "1" at operation 415, the next track is selected as the next consecutive track 206. However, where the random binary function 412 returns a "0" at operation 414, the random track selection function 410 selects random track 203 as the next track at operation 416. In one embodiment, if a track is already modified, it is not eligible to be modified again. Thus, if the next track selected has already been modified, then a random track is selected repeatedly until an unmodified track is found. Alternatively, function 410 can randomly select among non-modified tracks (e.g., by selecting from a list of unmodified tracks maintained at track selection module 112). Where a modified track is reached by function 412 (i.e., where a next consecutive track is reached and that next consecutive track has already been modified), track selection module 112 reverts to random track selection function 410 to select the next track. For example, where next consecutive track 206 has been modified, track 206 would not be selected by function 412; rather, a new random track would be selected by function 410.

With the next track selected, the method of FIG. 3A determines the block modification technique at operation 303. In one embodiment, the block modification technique is consistent for each iteration of this method. For example, if the block modification technique is first determined to update blocks in multiples of 4 KB after selecting the first track, then each subsequently selected track will also update blocks in multiples of 4 KB at operation 303. In another embodiment, the block modification technique is determined for each iteration of the method of FIG. 3A. Embodiments of selecting a block modification technique are described in detail above.

As illustrated above, the method of FIG. 3A continues until the quantity of tracks to modify has been reached at decision block 305, effectively ending the method at operation 306. In one embodiment of each visit to decision block 305, the currently selected track, now having blocks modified by the method shown at FIG. 3B, is sent from client 101 to protection storage system 104 to be integrated with the dataset at storage unit 109 (e.g., where track 200c is selected and modified at client 101 and subsequently sent to storage unit 109, track 200c will replace the corresponding track 200c from storage unit 109). Thus when the end of the method of FIG. 3A is reached at operation 306, the tracks changed throughout the method have been applied to an earlier full dataset (e.g., the dataset of tracks 200-200n) to create a new, complete dataset reflecting up-to-date changes that simulate real-world modifications.

Referring back to operation 303 of FIG. 3A, other embodiments of the described block modification technique are comprehended by this Specification. In such embodiments, the alternative block modification technique influences operation 304 and therefore replaces the block modification method depicted at FIG. 3B.

In a first alternative embodiment of operations 303 and 304 of FIG. 3A, a first group of blocks is modified. The first group of blocks can be of a random quantity generated by, for example, block selection module 113 or of a predetermined quantity stored at a data structure of block selection module 113 or at a database management system. Furthermore, the first group of blocks can have a starting block at any position within the selected track. The starting position of the first group of blocks can also be generated at random by block selection module 113 or a predetermined starting position can be stored at a data structure within block selection module 113 or at a database management system. Note that where the first group of blocks has a starting position so close to the end of the selected track that there is inadequate space for the complete first group of blocks, the first group of block can wrap around the selected track as described above. Once block selection module 113 determines the first group of blocks to modify at the alternative operation 303, the first group of blocks is modified by block modification module 115 at the alternative operation 304. Thereafter, the method of FIG. 3A iterates as described above. Alternatively, block selection module 113 can select a block of the selected track at random which can then be modified by block modification module 115. Subsequently, block selection module 113 can determine, based on a probability, if a next consecutive block in the selected track should be modified. This probability can be a predetermined probability stored at, for example, a data structure at block selection module 113 or at a database management system. This process repeats until the quantity of blocks is reached or until the probability indicates that a next consecutive block should not be modified.

A second alternative embodiment of operations 303 and 304 of FIG. 3A determines the block modification technique by sampling a block distribution table. The block distribution table represents a probability distribution for a quantity of blocks to modify. For example, assuming a track of 128 blocks and the probability of selecting sixty-four blocks is 0.1, then there is a ten percent probability that block selection module 113 will determine that sixty-four blocks are to be modified at the selected track when block selection module 113 samples the block distribution table. The block distribution table can be stored at, for example, a data structure at block selection module 113 or a database management system. Where the quantity of blocks derived from the block distribution table is less than the quantity of blocks at the selected track, then block selection module can determine a first group of blocks to modify equal to the quantity. Similar to the embodiment described above, the first group of blocks can have a starting block at any position within the selected track. The starting position of the first group of blocks can also be generated at random by block selection module 113 or a predetermined starting position can be stored at a data structure within block selection module 113 or at a database management system. Note that where first group of blocks has a starting position so close to the end of the selected track that there is inadequate space for the complete first group of blocks, the first group of block can wrap around the selected track as described above. Once block selection module 113 determines the first group of blocks to modify at the alternative operation 303, the first group of blocks is modified by block modification module 115 at the alternative operation 304. Alternatively, block selection module 113 can determine that the quantity of blocks should be modified at random. In such an embodiment, block selection module 113 can select a block of the selected track at random which may then be modified by block modification module 115. This process repeats until the quantity of blocks derived from the block distribution table is reached. Thereafter, the method of FIG. 3A iterates as described above.

In a third embodiment of operations 303 and 304 of FIG. 3A, a first group of blocks is modified. In this embodiment, the size of the first group of blocks can be all of the blocks at the selected track, a multiple of 4 KB, or a multiple of 8 KB. The size can be a predetermined and stored at a data structure of block selection module 113 or at a database management system. Furthermore, where the first group of blocks is not all of the blocks at the selected track, the first group of blocks can have a starting block at any position within the selected track. The starting position of the first group of blocks can also be generated at random by block selection module 113 or a predetermined starting position can be stored at a data structure within block selection module 113. Note that where first group of blocks has a starting position so close to the end of the selected track that there is inadequate space for the complete first group of blocks, the first group of block can wrap around the selected track as described above. Once block selection module 113 determines the first group of blocks to modify at the alternative operation 303, the first group of blocks is modified by block modification module 115 at the alternative operation 304. Thereafter, the method of FIG. 3A iterates as described above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory machine readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computer-implemented method to generate a synthetic data set, the computer-implemented method implemented by a track selection module and a block selection module executed by a processor, the computer-implemented method comprising:
determine a percentage of a set of tracks to modify;
converting the percentage of tracks to an integer amount of tracks;
setting a quantity of tracks to modify to the integer value;
selecting a first track in the set of tracks from at least one storage unit to modify;
modifying at least a first block in the first track;
determining, by the track selection module based on a track run probability, whether to modify a second track that is consecutive to the first track in the set of tracks or a third track that is selected randomly;
selecting, by the block selection module, at random at least a second block in the second track or a third block in the third track; and
modifying the second block or third block.

2. The method of claim 1 wherein modifying the first track further comprises:
determining, based on a block modification technique probability, whether to modify all blocks within a track, blocks in multiples of 4 kilobytes (KB), or blocks in multiples of 8 kilobytes.

3. The method of claim 1, further comprising:
modifying a group of blocks chosen at random within the first track, wherein a size of the group of blocks is a multiple of any one of 4 KB or 8 KB.

4. The method of claim 3, further comprising:
determining, based on a block modification run probability, whether to modify a next consecutive group of blocks, wherein a size of the next consecutive group of blocks is a multiple of any one of 4 KB or 8 KB.

5. The method of claim 1 wherein modifying the first block writes random data to the first block.

6. The method of claim 1 wherein modifying the first track further comprises:
selecting a quantity of blocks to modify;
selecting, within the first track, the first block as a starting block;
writing data to the first block; and writing to each consecutive block after the first block in the first track until the quantity of blocks is reached.

7. The method of claim 1 wherein modifying the first track further comprises:
sampling, at random, a block distribution table to obtain a quantity of blocks to modify;
selecting, at random, a first block of the first track and modifying the first block; and
selecting a second block of the first track and modifying the second block where the quantity of blocks has not been reached, wherein the second block is selected either at random or as the next consecutive block.

8. The method of claim 1 wherein modifying the second track or third track is performed if the quantity of tracks has not been reached.

9. A non-transitory computer-readable storage medium having instructions stored therein, which when executed by a computer, cause the computer to perform operations, the operations comprising:
determine a percentage of a set of tracks to modify;
converting the percentage of tracks to an integer amount of tracks;
setting a quantity of tracks to modify to the integer value;
selecting, at random, a first track in the set of tracks from a synthetic data generation system to modify;
modifying at least a first block in the first track;
determining, based on a track run probability, whether to modify a second track that is consecutive to the first track in the synthetic data generation system or a third track that is selected randomly;
selecting at random at least a second block in the second track or a third block in the third track; and
modifying the selected one of the second block and the third block.

10. A synthetic data set generation system, comprising:
a non-transitory machine-readable storage device to store a track selection module, a block selection module, a track modification module, and a block manipulation module; and
a processor in communication with the non-transitory machine-readable storage device, the processor configured to execute the track selection module, the block selection module, the track modification module, and the block manipulation module, where
the track selection module is configured to determine a percentage of a set of tracks to modify, convert the percentage of tracks to an integer amount of tracks, set a quantity of tracks to modify to the integer value, and select a first track to modify and to select a second track to modify that is consecutive to the first track or a third track to modify that is selected at random,
the block selection module, is configured to select a block modification technique,
the track modification module is configured to select a first group of blocks at the first track to modify based on the block modification technique, and
the block manipulation module is configured to modify the first group of blocks at the first track selected by the track selection module.

11. The synthetic data set generation system of claim 10, wherein the processor is further configured to execute a data management module that is configured to determine a quantity of tracks to manipulate.

12. The synthetic data set generation system of claim 10, wherein the track modification module is to further select, based on a block run probability, a second group of blocks that is consecutive to the first group of blocks.

13. The synthetic data set generation system of claim 10 wherein the block modification technique is one of a technique to modify all blocks at the first track, a technique to modify a group of blocks that is multiple of 4 KB at the first track, and a technique to modify a group of blocks that is multiple of 8 KB at the first track.

14. The synthetic data set generation system of claim 10 wherein the track modification module is further configured to select a second group of blocks at the second track where the track selection module selects the second track or a third group of blocks at the third track where the track selection module selects the third track.

15. The synthetic data set generation system of claim 14 wherein the block manipulation module is configured to further modify the second group of blocks where the track modification module selects the second group of blocks or the third group of blocks where the track modification module selects the third group of blocks.

16. The non-transitory computer-readable storage medium of claim 9 wherein modifying the first track further comprises:
determining, based on a block modification technique probability, whether to modify all blocks within a track, blocks in multiples of 4 kilobytes (KB), or blocks in multiples of 8 kilobytes.

17. The non-transitory computer-readable storage medium of claim 9, wherein the operations further comprise:
modifying a group of blocks chosen at random within the first track, wherein a size of the group of blocks is a multiple of any one of 4 KB or 8 KB.

18. The non-transitory computer-readable storage medium of claim 17, wherein the operations further comprise:
determining, based on a block modification run probability, whether to modify a next consecutive group of blocks, wherein a size of the next consecutive group of blocks is a multiple of any one of 4 KB or 8 KB.

19. The non-transitory computer-readable storage medium of claim 9 wherein modifying the first block writes random data to the first block.

20. The non-transitory computer-readable storage medium of claim 9 wherein modifying the first track further comprises:
selecting a quantity of blocks to modify;
selecting, within the first track, the first block as a starting block;
writing data to the first block; and
writing to each consecutive block after the first block in the first track until the quantity of blocks is reached.

21. The non-transitory computer-readable storage medium of claim 9 wherein modifying the first track further comprises:
sampling, at random, a block distribution table to obtain a quantity of blocks to modify;
selecting, at random, a first block of the first track and modifying the first block; and
selecting a second block of the first track and modifying the second block where the quantity of blocks has not been reached, wherein the second block is selected either at random or as the next consecutive block.

* * * * *